S. JOHNSTONE.
RESILIENT VEHICLE WHEEL.
APPLICATION FILED JULY 17, 1913.
1,098,577. Patented June 2, 1914.
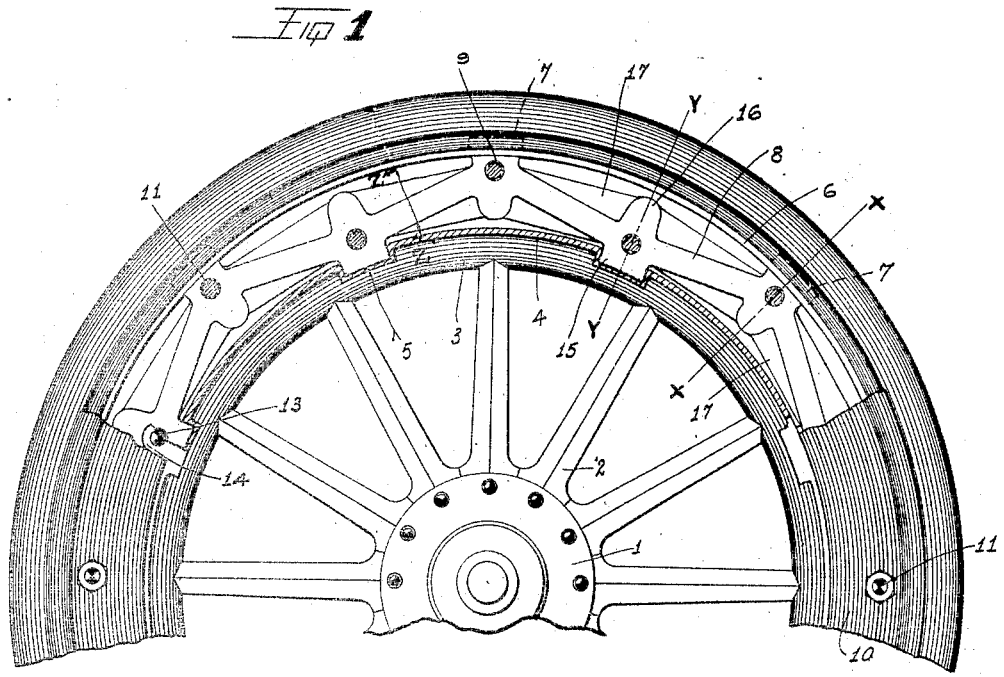
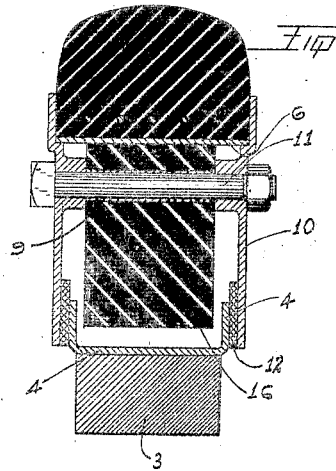
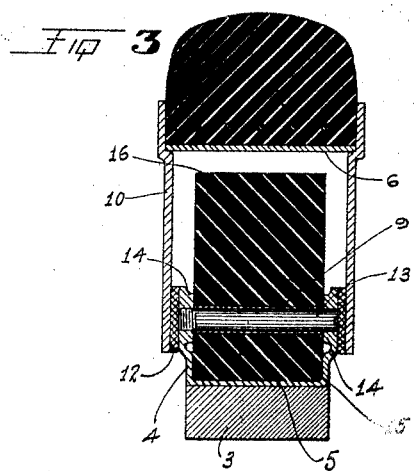
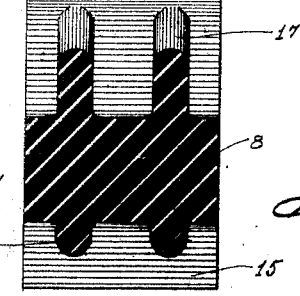

UNITED STATES PATENT OFFICE.

SAMUEL JOHNSTONE, OF SACRAMENTO, CALIFORNIA, ASSIGNOR OF THREE-EIGHTHS TO JOSEPH D. CORNELL AND TWO-EIGHTHS TO SIM CANMAN, BOTH OF SACRAMENTO, CALIFORNIA.

RESILIENT VEHICLE-WHEEL.

1,098,577.  Specification of Letters Patent.  Patented June 2, 1914.

Application filed July 17, 1913. Serial No. 779,468.

*To all whom it may concern:*

Be it known that I, SAMUEL JOHNSTONE, a citizen of the United States, residing at Sacramento, in the county of Sacramento, State of California, have invented certain new and useful Improvements in Resilient Vehicle-Wheels; and I do declare the following to be a clear, full, and exact description of the same, such as will enable others skilled in the art to which it appertains to make and use the same, reference being had to the accompanying drawings, and to the characters of reference marked thereon, which form a part of this application.

This invention relates to improvements in vehicle wheels and particularly to a device adapted to embody a continuous rubber resilient member formed in one piece and placed between an inner and outer ring, one slidable over the other in such a manner and with such construction as to sustain the weight of the vehicle and afford ample resiliency and elasticity between the inner and outer ring in order to compensate for and overcome the shocks or jolts due to the wheels riding over uneven surfaces. The device is further designated to be securely protected from external wear and contact, thus insuring a device which will be of durable construction and free from crystallization and one which will not be subject to the varying conditions due to expansion or contraction owing to heat or cold. The device is further adapted to be disposed between the inner and outer ring under an expansive pressure, whereby it will sustain the load of the vehicle mounted on the wheels under all normal conditions.

A further object of the invention is to produce a simple and inexpensive device and yet one which will be exceedingly effective for the purposes for which it is designed.

These objects I accomplish by means of such structure and relative arrangement of the parts as will fully appear by a perusal of the following specification and claim.

On the drawings similar characters of reference indicate corresponding parts in the several views.

Figure 1 is a fragmentary view of a wheel, partly broken out showing my improved structure thereon. Fig. 2 is a sectional view taken on a line X—X of Fig. 1. Fig. 3 is a sectional view taken on a line Y—Y of Fig. 1. Fig. 4 is a sectional view taken on a line Z—Z of Fig. 1.

Referring now more particularly to the characters of reference on the drawings, the numeral 1 designates the hub of the vehicle, the numeral 2 the spokes thereof and the numeral 3 the felly. Secured to the felly 3 is a channel-shaped rim 4 provided at spaced points with depending recesses 5. Spaced from the rim 4 is an outer auxiliary rim 6 provided with recesses 7.

The numeral 8 designates a rubber member disposed in staggered relation and provided at each apex with a bearing or ferrule 9 vulcanized to the rubber.

The numeral 10 designates the side plates adapted to receive bolts 11 which project through 10 together as one member. The side plates 10 are adapted to slide over the sides of the channel-shaped rim 4 to prevent friction and also to keep dust and dirt entering into the interior equipment.

Disposed through the lower row 7 and ferrules 9 are screw pins 13 adapted to screw into projecting shoulders 14 on the inside of the channel-shaped rim 4. The member 8 at a point adjacent to each ferrule 9 is provided with a square shoulder 15 adapted to fit into the recesses 5 and 7 in order to prevent the member 8 by any chance from slipping out of position and also to save wear on the bearing points and other parts. On the other side of each ferrule 9 is a projecting bumper or shock absorber 16 which clears the rim 6 a sufficient distance to afford proper resiliency.

Connecting each of the bumpers 16 to the adjacent square shoulders 15 are truss or supporting webs 17 formed as an integral part of the balance of the structure, the function of which members 17 is to prevent the members 15 and 16 from stretching out of position or wearing with the operation of the device.

As can readily be seen the foregoing structure provides a rubber resilient united equipment within and encircling the wheel which bears on the inner and outer rims, such inner and outer rims carrying the resilient member in equal proportions. The enlarged shoulders at the point of bearing resting in the recesses are held in position by the said recesses and the bolts 13.

As will be further noted, the structure of the member 8 disposed in staggered relation as described and extending alternately from the inner and outer rim forms a complete and continuous suspensory and resilient member both to maintain the weight of the vehicle and also to permit of the vertical motion of the wheels and at the same time present a resilient and elastic support to overcome the jolts when encountering the unevenness of the ground surface. In addition to this the shock absorbers 16 receive any of the direct radial strain against the wheel and prevent any undue amount of friction against the other parts. As before stated the members 17 keep all the parts in fixed and true position necessary to perfect operation.

From the foregoing description it will be readily seen that I have produced such a device as substantially fulfils the objects of the invention as set forth herein.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:

A device of the character described comprising an inner and outer rim, a continuous resilient member disposed between said rims and secured to each, each of said rims having recesses, shoulders on said resilient member disposed in said recesses, bumpers on said resilient member lying between said rims and truss webs formed as an integral part of said bumpers and said shoulders and connecting therewith, as described.

In testimony whereof I affix my signature in presence of two witnesses.

SAMUEL JOHNSTONE.

Witnesses:
L. H. Drew,
C. A. Gardner.

---

Copies of this patent may be obtained for five cents each, by addressing the "Commissioner of Patents. Washington, D. C."